US011506336B2

(12) United States Patent
Kojima et al.

(10) Patent No.: US 11,506,336 B2
(45) Date of Patent: Nov. 22, 2022

(54) HIGH PRESSURE TANK

(71) Applicant: TOYOTA JIDOSHA KABUSHIKI KAISHA, Toyota (JP)

(72) Inventors: Makoto Kojima, Toyota (JP); Akira Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 17/214,154

(22) Filed: Mar. 26, 2021

(65) Prior Publication Data
US 2021/0215294 A1 Jul. 15, 2021

Related U.S. Application Data

(63) Continuation of application No. 16/222,162, filed on Dec. 17, 2018, now abandoned.

(30) Foreign Application Priority Data

Dec. 28, 2017 (JP) .............................. JP2017-253193

(51) Int. Cl.
*F17C 1/06* (2006.01)
*F17C 1/16* (2006.01)
*F17C 1/02* (2006.01)

(52) U.S. Cl.
CPC .................. *F17C 1/06* (2013.01); *F17C 1/02* (2013.01); *F17C 1/16* (2013.01); *F17C 2201/0109* (2013.01); *F17C 2201/032* (2013.01); *F17C 2201/056* (2013.01); *F17C 2203/012* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2205/0115* (2013.01);
(Continued)

(58) Field of Classification Search
CPC ..................................... F17C 1/02; F17C 1/04
USPC ......................................... 220/592.25, 592.24
See application file for complete search history.

(56) References Cited

U.S. PATENT DOCUMENTS 5,476,189 A * 12/1995 Duvall ...................... F17C 1/16
220/62.19
2004/0026437 A1* 2/2004 Hembert ............... F17C 13/123
220/630
(Continued)

FOREIGN PATENT DOCUMENTS

CN 1344359 A 4/2002
CN 104662355 A 7/2015
(Continued)

OTHER PUBLICATIONS

FR 2792392 English Translation (Year: 1999).

*Primary Examiner* — Jeffrey R Allen
(74) *Attorney, Agent, or Firm* — Dickinson Wright, PLLC

(57) ABSTRACT

A high pressure tank includes: a container body including dome parts; a reinforcement layer provided on an outer surface of the container body and including fiber-reinforced resin; and a protective member provided on an outer surface of the reinforcement layer, wherein the protective member includes a first layer disposed at the outer surface of the reinforcement layer that covers at least a part of the dome parts, and a second layer disposed outward of the first layer. The first layer is more deformable due to the same load applied from the outside than the second layer is.

5 Claims, 7 Drawing Sheets

(52) U.S. Cl.
CPC ......... *F17C 2205/0196* (2013.01); *F17C 2205/0323* (2013.01); *F17C 2205/0332* (2013.01); *F17C 2205/0394* (2013.01); *F17C 2221/012* (2013.01); *F17C 2223/0123* (2013.01); *F17C 2223/036* (2013.01); *F17C 2260/011* (2013.01); *F17C 2260/042* (2013.01); *F17C 2270/01* (2013.01); *F17C 2270/0168* (2013.01)

(56) References Cited

U.S. PATENT DOCUMENTS

2009/0255940 A1* 10/2009 Murate .................. F17C 1/16
220/661
2015/0204483 A1    7/2015  Kojima et al.
2018/0156387 A1    6/2018  Maekawa

FOREIGN PATENT DOCUMENTS

| DE | 69420111 T2     | 12/1999 |
|----|-----------------|---------|
| DE | 60017256 T2     | 6/2005  |
| DE | 102017127912 A1 | 6/2018  |
| FR | 2792392 A1      | 4/1999  |
| JP | 2002542443 A    | 12/2002 |
| JP | 2006300138 A    | 11/2006 |
| JP | 2007155116 A    | 6/2007  |
| JP | 2008169881 A    | 7/2008  |
| JP | 2011-220425 A   | 11/2011 |
| JP | 2014-074470 A   | 4/2014  |
| JP | 2014-185714 A   | 10/2014 |
| JP | 2017-101763 A   | 6/2017  |
| JP | 2017-145936 A   | 8/2017  |
| JP | 2017166545 A    | 9/2017  |
| KR | 10-2015-0051231 A | 5/2015 |

\* cited by examiner

COMPARATIVE EXAMPLE

COMPARATIVE EXAMPLE

HIGH PRESSURE TANK

INCORPORATION BY REFERENCE

This application is a continuation of U.S. application Ser. No. 16/222,162, filed Dec. 17, 2018, which claims the benefit of the disclosure of Japanese Patent Application No. 2017-253193 filed on Dec. 28, 2017 including the specification, drawings and abstract, the entireties of which are incorporated herein by reference.

BACKGROUND

1. Technical Field

The present disclosure relates to a high pressure tank.

2. Description of Related Art

A high pressure tank storing a gas such as a hydrogen gas at a high pressure is required to have high pressure resistance; therefore, the high pressure tank is commonly provided with a reinforcement layer formed by winding fiber-reinforced resin such as CFRP (carbon fiber reinforced plastics) around an outer surface of a container body formed by a resin liner. Gas leakage might be caused to such a high pressure tank during use if cracks are generated in a container body thereof due to, for example, an accidental drop during manufacturing or transportation. Hence, safety standards for a high pressure tank are defined by the High Pressure Gas Safety Act and the like. It has conventionally been proposed to provide a container body for a high pressure gas with a protector so as to satisfy the safety standards and safely use the high pressure tank (see Japanese Patent Application Publication No. 2014-74470).

SUMMARY

By providing a protector, even when a high pressure tank drops and receives impact, such a risk that generates cracks in a container body of the tank can be avoided or reduced. Hence, the protector is often provided to a relatively weaker portion in impact in the container body, such as a joined portion between a barrel plate part and an end plate part (dome part), that is, a so-called shoulder part. Since a high pressure tank is installed in a vehicle, there is a request for minimizing its outer shape. Hence, study on a further desirable structure of the protector has been requested.

The present disclosure can realize the following modes or application examples.

The first aspect of the present disclosure relates to a high pressure tank. The high pressure tank includes: a container body including dome parts; a reinforcement layer provided on an outer surface of the container body and including fiber-reinforced resin; and a protective member provided on an outer surface of the reinforcement layer. Here, the protective member includes a first layer disposed at the outer surface of the reinforcement layer that covers at least a part of the dome parts, and a second layer disposed at outward of the first layer. The first layer of the protective member is more deformable due to the same load than the second layer is. The configuration can promote enhancement of impact resistance performance of the high pressure tank. Here, that the "impact resistance performance is high" means difficulty of generation of breakage or cracks in the container body when the high pressure tank receives impact due to dropping or the like. If two high pressure tanks drop from the same height, and one of the high pressure tanks has breakage and cracks but the other has no breakage and cracks, it can be said that the other high pressure tank has higher impact resistance performance. Regardless of such a drop test, in a case in which a load in the same direction as the dropping direction of the high pressure tank is applied to the high pressure tank, such a high pressure tank that has no breakage or cracks against a higher load may be deemed to have higher impact resistance performance.

In the above high pressure tank, a static compression value of the first layer may be smaller than a static compression value of the second layer. Here, the static compression value can be defined as a load per unit area necessary for attaining reduction in thickness of a target at the same rate, that is, ½ reduction in thickness of the original thickness of the target, for example. By setting the static compression value of the first layer to be smaller than the static compression value of the second layer, the first layer becomes more deformable due to the same load than the second layer, thereby increasing the impact resistance performance of the high pressure tank.

In the above high pressure tank, the first layer and the second layer may be resin layers. By forming both the first and second layers of resin layers, the protective members can be easily formed.

In the above high pressure tank, the first layer and the second layer may be resin layers including polyurethane. The static compression value of polyurethane can be widely controlled based on the compositions, and thus it is possible to easily manufacture a desired protective member. For example, hardness of polyurethane can be adjusted by changing a combination of polyol components and polyisocyanate components used for forming the polyurethane, or by changing the kinds and the use rate of polypropylene glycol (PPG) and polymer polyol (POP) in the polyol components. For example, in order to increase hardness of polyurethane foam by using POP, amount of vinyl-based monomer to be used may be increased so as to increase a content of polymer particles in the POP. Accordingly, polyurethane can be harder and become less deformable due to the same load.

In the above high pressure tank, the second layer may be provided so as to cover an entire outer surface of the first layer. Of course, a part of the outer surface of the first layer may be covered by the second layer. By covering the entire outer surface of the first layer, an external load can be prevented from being directly applied to the first layer, and thus the function of the protective member formed in a double-layered structure can sufficiently work.

In the above high pressure tank, the static compression value of the first layer may be 1/1.9 or less of the static compression value of the second layer. With this configuration, it is possible to sufficiently enhance the impact resistance performance of the protective member.

In the above high pressure tank, the first protective member may be disposed at a position where the high pressure tank comes in contact with a horizontal plane when the high pressure tank erected in the perpendicular direction is inclined at an angle of 45 degrees from the perpendicular direction. This configuration allows the impact resistance performance to be sufficiently exerted when the high pressure tank drops in a state of being inclined at the angle of 45 degrees.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
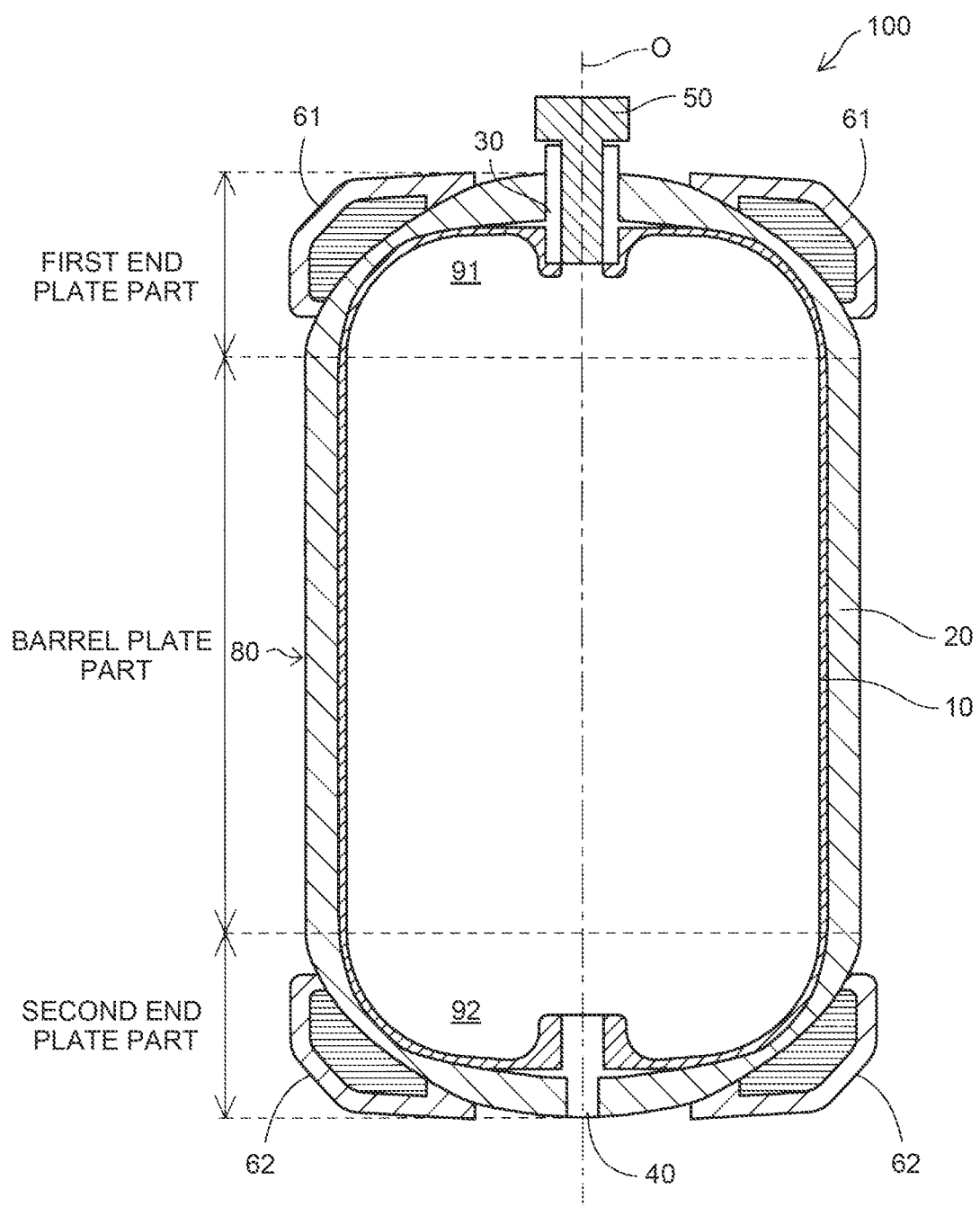
FIG. 1 is a sectional view of a high pressure tank seen in sectional view taken along a center axis of the high pressure tank.

FIG. 1 is a sectional view of a high pressure tank 100 seen in sectional view taken along a center axis O of the high pressure tank 100. The high pressure tank 100 of the present embodiment is installed in an automobile, and stores a hydrogen gas. Here, the high pressure tank denotes a high pressure tank specified by the High Pressure Gas Safety Act of Japan. Needless to mention that the high pressure tank may be a high pressure tank conforming to the standards of the GHS. The high pressure tank 100 includes: a resin liner 10; a reinforcement layer 20; a valve-side mouth member 30; an end-side mouth member 40; a valve 50; a first protective member 61; and a second protective member 62.

The resin liner 10 is a member for defining a space to be charged with hydrogen, and is produced by resin-molding. The reinforcement layer 20 is a member for reinforcing the resin liner 10 and covers the outer circumference of the resin liner 10. The reinforcement layer 20 is made of fiber-reinforced resin, and a material thereof is CFRP (carbon fiber reinforced plastics). The reinforcement layer 20 is formed by the FW (filament winding) method. The resin liner 10 forms a container body of the high pressure tank 100.

As shown in FIG. 1, the tank body includes: a barrel plate part 80; a first end plate pan 91; and a second end plate part 92. The barrel plate pan 80 includes a part of the resin liner 10 and a pan of the reinforcement layer 20, and has a linear sectional shape. The extending direction of the sectional shape coincides with the direction of the center axis O shown in FIG. 1. The first end plate part 91 and the second end plate part 92 include a part of the resin liner 10 and a part of the reinforcement layer 20 but exclude the barrel plate pan 80. That is, each of these parts is a pan having a sectional shape that does not linearly extend along the longitudinal direction of the tank, and more specifically, the part is in a curved shape, usually in a semi-circular shape. Because of this shape, the first end plate part 91 and the second end plate part 92 are sometimes referred to as dome parts.

The valve-side mouth member 30 has a generally cylindrical shape, and includes a flange projecting from its outer circumferential surface. The valve-side mouth member 30 is fixed in a state in which the flange is held between the resin liner 10 and the reinforcement layer 20 in the first end plate part 91. In FIG. 1, for the sake of simplifying the drawing, hatching indicating a sectional view is not applied to the valve-side mouth member 30. The inner circumferential surface of the valve-side mouth member 30 functions as a port of hydrogen. The valve 50 functions to open and close the port of the hydrogen in the valve-side mouth member 30. The valve 50 includes a fusible plug valve (not illustrated). The fusible plug valve is a kind of a safety valve, and has a function to release pressure of a stored gas to outside when the temperature of the high pressure tank 100 becomes a predetermined temperature or more. The valve-side mouth member 30 is formed with a female screw on its inner circumferential surface, and the valve 50 is formed with a male screw on its outer circumferential surface. The screws are tightened together so as to seal the inside of the resin liner 10.

The end-side mouth member 40 is disposed to the second end plate part 92 in such a manner as to be exposed to the inside and the outside of the tank. This disposition enables heat inside the tank to be released to the outside. The end-side mouth member 40 is also used for rotatably holding the resin liner 10 when the CFRP that is the material of the reinforcement layer 20 is wound around the resin liner 10. In order to enhance efficiency of heat radiation, as the material of the end-side mouth member 40, metal such as aluminum is adopted in the present embodiment. In FIG. 1, for the sake of simplifying the drawing, hatching indicating a sectional view is not applied to the end-side mouth member 40, either.

The first protective member 61 covers a thin-wall portion of the first end plate part 91 and the vicinity (both are also collectively referred to as a "thin-wall portion and others", hereinafter) so as to protect the thin-wall portion from impact. The thin-wall portion of the first end plate part 91 is a portion where the reinforcement layer 20 has the thinnest wall thickness in the first end plate part 91, and corresponds to an intermediate portion of the first end plate part 91. The intermediate portion is a portion apart from the valve-side mouth member 30 and from the barrel plate part 80. The reason why such a thin-wall portion is generated is because the reinforcement layer 20 is formed by using the FW method. The thin-wall portion is weaker with impact and high temperature than the other portion. Needless to mention that the first protective member 61 and the second protective member 62 may be provided even if there is no thin-wall portion.

In order to cover the thin-wall portion, the first protective member 61 is formed in a shape based on a conic shape from which an apex portion is removed, (the shape is referred to as a "flat marker cone shape", hereinafter), and the first protective member 61 covers at least a part of the surface of the high pressure tank 100. In order to enhance the impact resistance performance of the first protective member 61, a structure including two resin layers described later is adopted in the first protective member 61. The first protective member 61, after being die-formed, is fixed to the outer surface of the reinforcement layer 20 with an adhesive agent. Positions where the first protective member 61 and the second protective member 62 are arranged include positions where the high pressure tank 100 comes in contact with a horizontal plane when the high pressure tank 100 in a state of being erected in the perpendicular direction, while the valve-side mouth member 30 is oriented in the downward or upward direction, is inclined at an angle of 45 degrees from the perpendicular direction.

The second protective member 62 covers the thin-wall portion and others of the second end plate part 92 so as to protect the thin-wall portion from an impact and high temperature. The outer shape and the structure of the second protective member 62 are almost the same as the outer shape and the structure of the first protective member 61. The second protective member 62 is fixed to the reinforcement layer 20 with the adhesive agent. The second protective member 62 has a double-layered internal structure, as similar to the first protective member 61. The second protective member 62 is produced by die-forming. The first and second protective members 61, 62 are also referred to as "protectors" in some cases.

Figure 2:
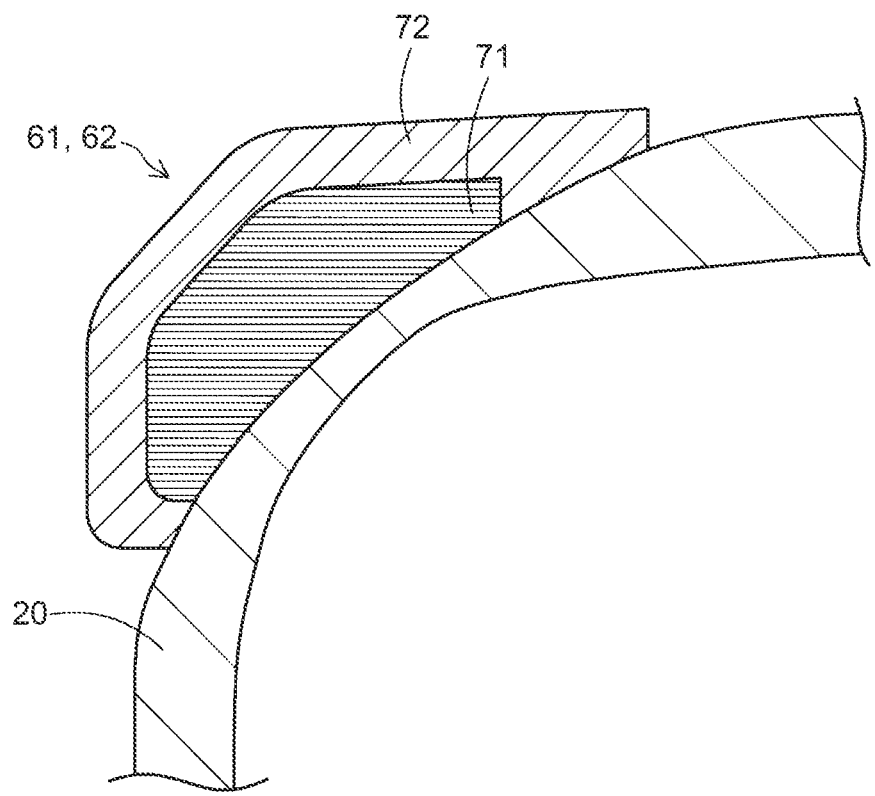
FIG. 2 is a sectional view showing an enlarged section of a protective member.

The double-layered structure included in each of the first and second protective members 61, 62 will be described with reference to FIG. 2. FIG. 2 is a sectional view showing an enlarged section of the first and the second protective members 61, 62. As shown in FIG. 2, each of the first and second protective members 61, 62 is formed by an inner first layer 71 and an outer second layer 72. The second layer 72 covers the entire region of the first layer 71 in the present embodiment. In the present embodiment, the materials of the first layer 71 and the second layer 72 are both polyurethane, but the first layer 71 and the second layer 72 are different in deformability. The first layer 71 is more deformable due to an external load than the second layer 72 is. In the present embodiment, the first layer 71 has the following properties: density of 0.25 g/cm; and static compression value of approximately 570 kPa, and the second layer 72 has the following properties: density of 0.67 g/cm$^3$; and static compression value of 1100 kPa or more. The physical property values of polyurethane can be easily controlled based on additives and the degree of foaming. As the additive, expanded graphite can be considered, but with respect to the static compression value, the above values can be realized without adding expanded graphite. In this embodiment, the static compression value is defined as a load at the moment of compressing the target by 50% in the thickness direction. Hence, in this embodiment, the ratio of a static compression value of the second layer/a static compression value of the first layer is approximately 1100/570≈1.9.

Figure 3:
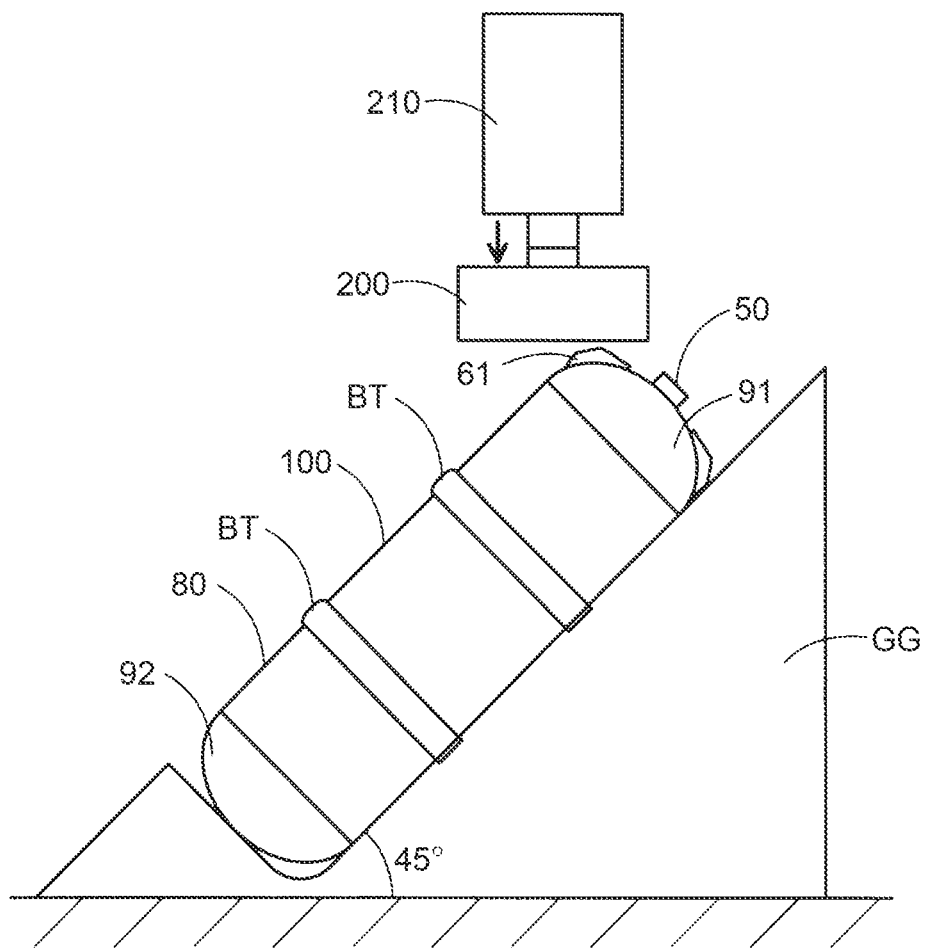
FIG. 3 is an explanatory view showing an outline of a testing apparatus for simulating a drop test of the high pressure tank so as to determine how much load the high pressure tank can withstand.

The impact strength of the high pressure tank 100 including the first protective member 61 and the second protective member 62 as structured above will be described. FIG. 3 is an explanatory view showing an outline of a testing apparatus for simulating a drop test of the high pressure tank so as to determine how much load the high pressure tank 100 can withstand. As the drop test, a drop test at an angle of 45 degrees that is the most severe condition for the high pressure tank 100 (the Japan Automobile Research Institute, "Technical Standards for Compressed Hydrogen Container for Automobile Fuel System" (JARIS001 (2004))) was simulated. In FIG. 3, the high pressure tank 100 as a test target was fixed to a jig GG at an angle of 45 degrees with a belt BT or the like, and a static load was applied to the first protective member 61 from above by using a pressure plate 200 of a load testing apparatus 210. The pressure plate 200 was moved downward by the load testing apparatus 210. A load applied by the movement onto the first protective member 61 of the high pressure tank 100 was measured using a load cell or the like.

Figure 4:
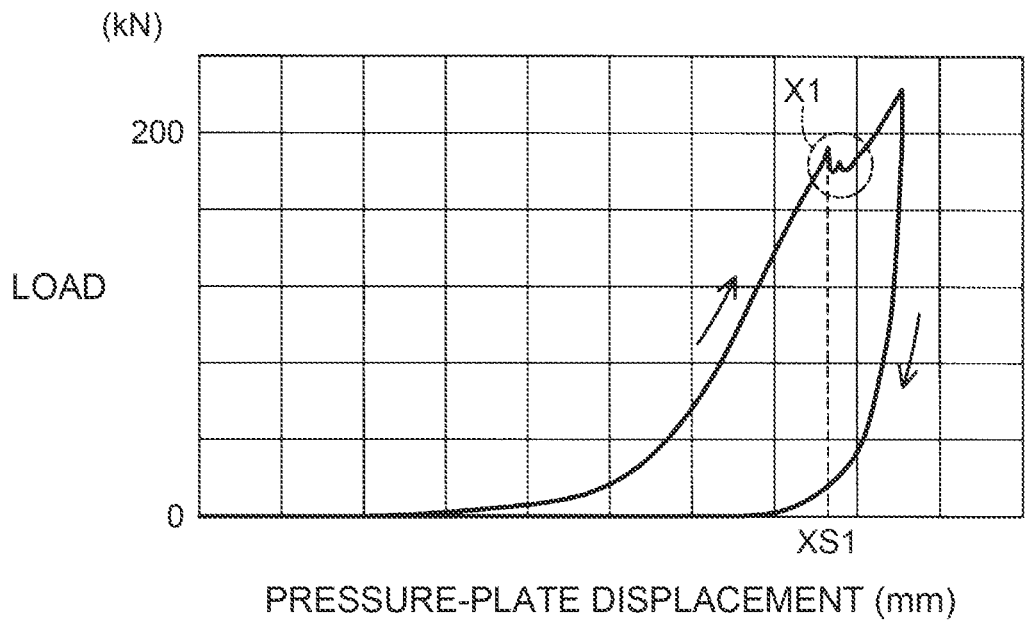
FIG. 4 is a graph showing impact resistance performance of the high pressure tank of the embodiment.

FIG. 4 shows a result of the drop test. In FIG. 4, a horizontal axis indicated as "Pressure-plate Displacement" represents amount of movement of the pressure plate 200 from a position where the pressure plate 200 contacts with the first protective member 61. As shown in the graph, in the high pressure tank 100 including the first protective member 61 of the present embodiment, the load having monotonously increased varies around pressure-plate displacement XS1, which suggests that any breakage or cracks were caused to the CFRP layer of the high pressure tank 100. The load at this time was nearly 200 kN (kilonewton). Actually, when the high pressure tank 100 was inspected after the test, it was found that the CFRP layer had cracks near the first protective member 61.

Figure 5:
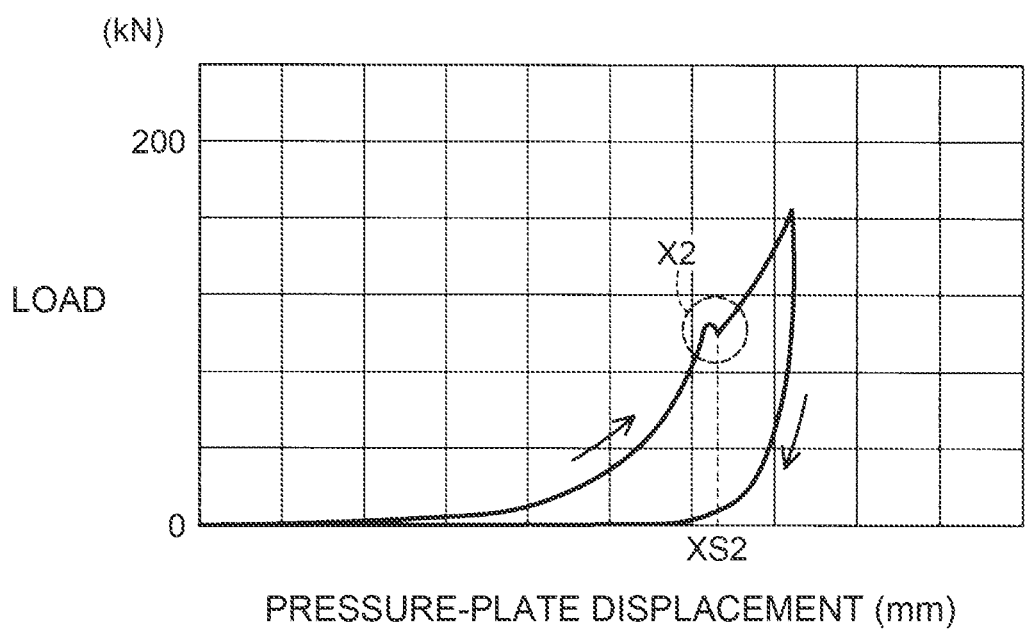
FIG. 5 is a graph showing impact resistance performance of a high pressure tank as a comparative example.

In the meantime, FIG. 5 shows a graph of a drop test result as a comparative example and a case in which, in the first protective member 61, the material of the first layer and the material of the second layer were exchanged from each other. That is, the graph of FIG. 5 shows a drop test result in a case in which, in the first protective member 61, a material having a static compression value of 1100 was used for the inner first layer, and a material having a static compression value of approximately 570 was used for the outer second layer. As shown in the graph, in the high pressure tank 100 including the first protective member 61 in which arrangement of the physical properties of the first layer and the second layer was reversed to that in the first protective member 61 of the present embodiment, the load having monotonously increased varies around pressure-plate displacement XS2, which suggests any breakage or cracks were caused to the resin liner 10 of the high pressure tank 100. The displacement XS2 of the pressure plate 200 at this moment was approximately 20 to 30% smaller than the displacement XS1 in the case of the high pressure tank 100 of the embodiment, and the load at the moment of breakage was approximately 100 kN (kilonewton).

A test result in which the high pressure tank 100 was put upside down and a load was applied by the load testing apparatus 210 from a state in which the pressure plate 200 was in contact with the second protective member 62 was the same as above. Also compared with a high pressure tank including a first protective member 61 having a single layer, the high pressure tank 100 including the first protective member 61 and the second protective member 62 of the present embodiment exhibited a high impact resistance performance. Particularly, when a ratio of the static compression values of the first layer and the second layer, that is, the static compression value of the first layer/the static compression value of the second layer was 1/1.9 or less, significant improvement of the impact resistance performance was exhibited.

According to the above-described embodiment, each of the first protective member 61 and the second protective member 62 provided in the vicinity of the shoulder part of the high pressure tank 100 is configured in a double-layered structure, and the static compression value of the inner first layer 71 is set to be smaller than the static compression value of the outer second layer 72. As a result, it is found that a load causing breakage or cracks to the resin liner 10 is increased, and thus higher impact resistance performance against impact of dropping or the like can be realized, compared with a case in which a single-layered structure is employed or a case in which the static compression value of the inner first layer is greater than the static compression value of the outer second layer. When the same impact resistance performance is realized, the thickness of the protective member can be thinner than the thickness of the conventional protective member, to thereby reduce the entire thickness.

Figure 6:
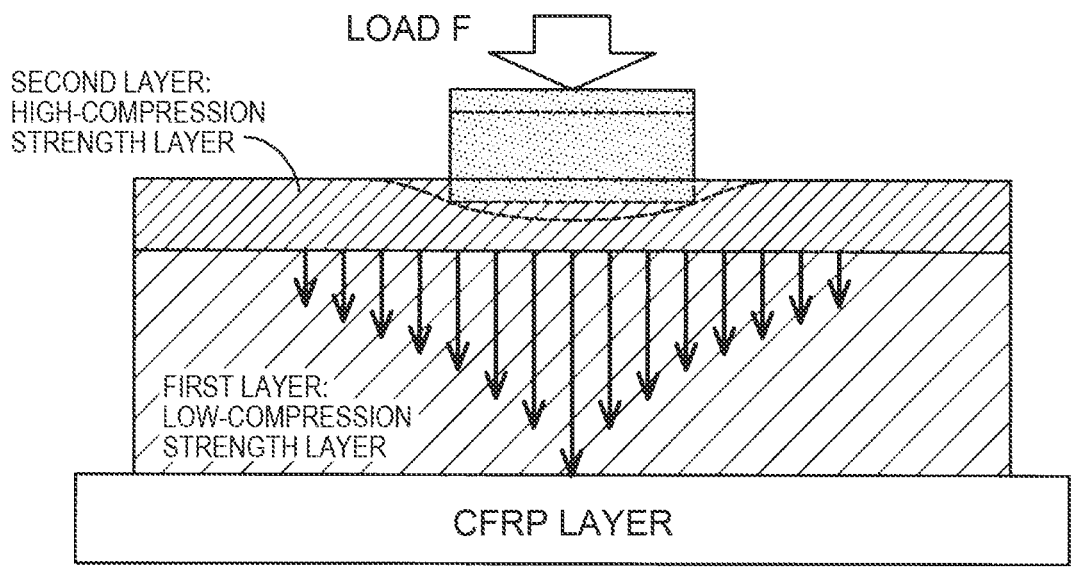
FIG. 6 is an explanatory view showing the degree of a load distribution when a static compression value of a first layer provided on a CFRP layer that is a reinforcement layer is smaller than a static compression value of a second layer located outward of the first layer.

It can be considered that the reason why higher impact resistance performance can be realized in each of the first protective member 61 and the second protective member 62, where the static compression value of the inner first layer 71 is smaller than the static compression value of the outer second layer 72, is as follows. FIG. 6 shows a case in which the static compression value of the first layer provided on the CFRP layer that is the reinforcement layer 20 is smaller than the static compression value of the layer above the first layer, that is, the outer second layer. The layer having a lower static compression value is herein referred to as a "low-compression strength layer", and the layer having a higher static compression value than the lower static compression value is referred to as a "high-compression strength layer". As exemplified in FIG. 6, when a load F is applied from the outside, that is, from the high-compression strength layer that is the second layer, the high-compression strength layer becomes deformed, but the range of the deformation is small. On the other hand, since the low-compression strength layer has a smaller compression strength than the compression strength of the outer second layer, when the load F transferred to the low-compression strength layer, the deformation of the low-compression strength layer propagates in a wide range. As a result, the load F transferred from the inner first layer to the CFRP layer that is the reinforcement layer 20 is distributed in a wide range, and thus a load per unit area can be reduced to a small load.

Figure 7:
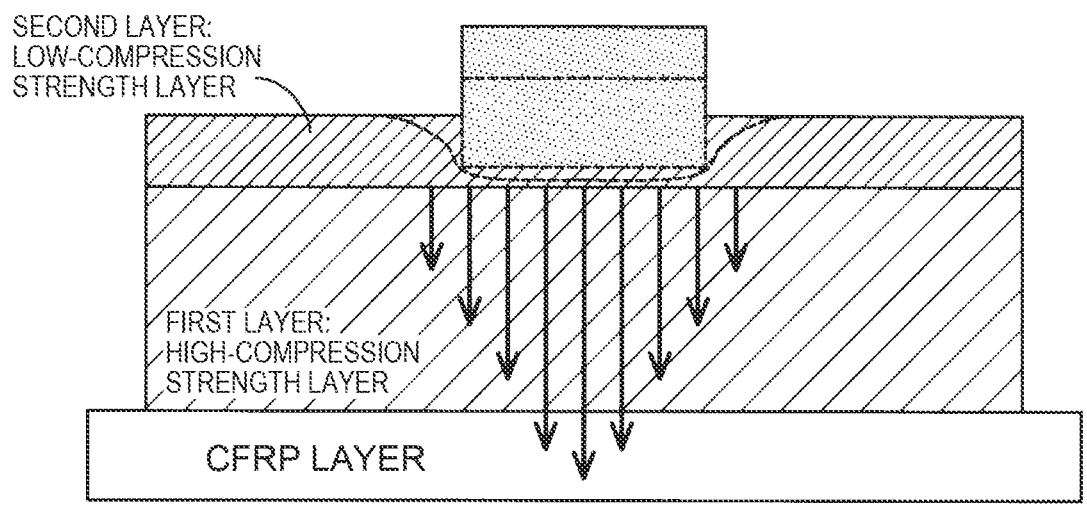
FIG. 7 is an explanatory view showing the degree of a load distribution when a static compression value of the first layer provided on the CFRP layer that is the reinforcement layer is greater than a static compression value of the second layer located outward of the first layer.

On the other hand, as shown in FIG. 7, if the relationship of arrangement of the first layer and the second layer is reversed, the outer second layer is the low-compression strength layer, so that the layer is easily deformed due to the load F from the outside. However, because the inner first layer is the high-compression strength layer, the load F transferred to the inner first layer transferred without propagating so widely, to the CFRP layer that is the reinforcement layer 20. Consequently, a load per unit area becomes increased; thus, breakage and cracks are likely to be caused to the resin liner 10.

The relationship of hardness between the first layer 71 and the second layer 72 in each of the first protective member 61 and the second protective member 62 is not specifically limited as far as the inner first layer is more deformable than the outer second layer is. Deformability can be defined in terms of the degree of the static compression value if the first and second layers 71, 72 are both resin layers. The outer second layer 72 is not limited to resin, and may be formed of metal, wooden material, carbon fibers, and so on. In this case, it makes no sense to define a load to reduce the thickness by 50%, or the like; therefore, the static compression value may be defined rather in terms of the degree of the amount of deformation when a constant load is applied in a direction where the thickness is compressed. Using other physical property values, such as Young's modulus, deformability may also be defined.

The combination of the first layer and the second layer may be such a combination that includes the first layer of soft resin and the second layer of hard resin. The combination may be a combination including the first layer of soft resin and the second layer of metal. The combination may be a combination including the first layer of soft resin and the second layer of carbon resin. Alternatively, the combination may be a combination including the first layer of foamed resin and the second layer of hard resin.

Here, the soft resin denotes resin having a low static compression value, such as polyurethane, EVA resin, and low density-polyethylene (LDPE or PE-LD). An example of the hard resin may include epoxy resin, urea resin, phenol resin, melamine resin, unsaturated polyester resin; and a typical resin of this is such resin that has a relatively higher static compression value than the static compression value of the soft resin, such as polycarbonate, polyacetal, ABS resin, and high density polyethylene.

The above metal also includes alloy. Relatively soft metal, such as aluminum, copper, and soft iron, may be adopted. Composite material of metal, ceramic, resin, and others may be employed. In addition, material formed of a cluster of metallic fibers, material formed of woven metallic fibers, or a honeycomb structure may also be adopted.

In the present embodiment, the first protective member 61 and the second protective member 62 respectively provided to the first end plate part 91 and the second end plate part 92 of the high pressure tank 100 are indicated by different reference numerals, but both may be formed by the same member. Alternatively, both may be different members. The meaning that "both are different" may include a case in which materials forming the first layer and the second layer are at least partially different from each other or a case in which the materials are the same but both are partially different at least in thickness or width. In addition, only either one of the first protective member 61 and the second protective member 62 may be provided. Alternatively, in addition to the first protective member 61 and the second protective member 62, a third protective member may further be provided at a position where the third protective member does not overlap the first protective member 61 and the second protective member 62.

Figure 8:
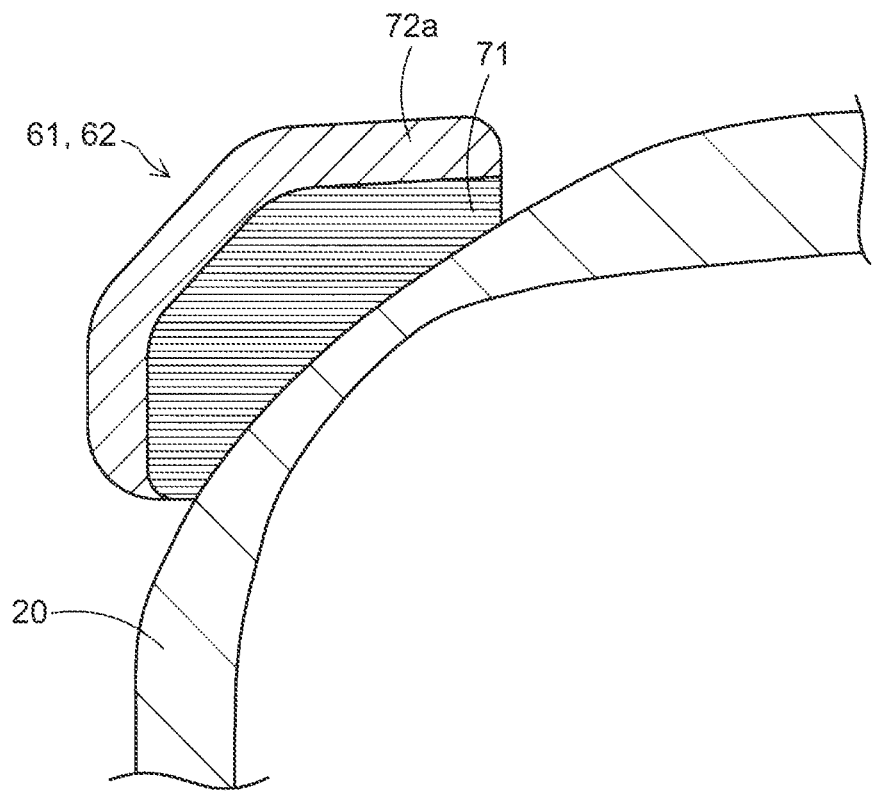
FIG. 8 is an enlarged sectional view showing another configuration example of first and second protective members.

In the above embodiment, the first protective member 61 and the second protective member 62 are fixed to the reinforcement layer 20 with an adhesive agent, but the first protective member 61 and the second protective member 62 may be fixed using a double sided tape, or may be fixed by another fixing member, such as a belt. In the configuration shown in FIG. 2, the outer second layer 72 totally covers the first layer 71, and is in direct contact with the reinforcement layer 20 on the outer circumference of the first layer 71. In the contact portion, the first layer 71 may or may not be bonded to the reinforcement layer 20. Alternatively, as exemplified in FIG. 8, it may be configured that a second layer 72a does not spread from the first layer 71 in the outer circumferential direction of the first layer 71 so as to be out of contact with the reinforcement layer 20.

Figure 9:
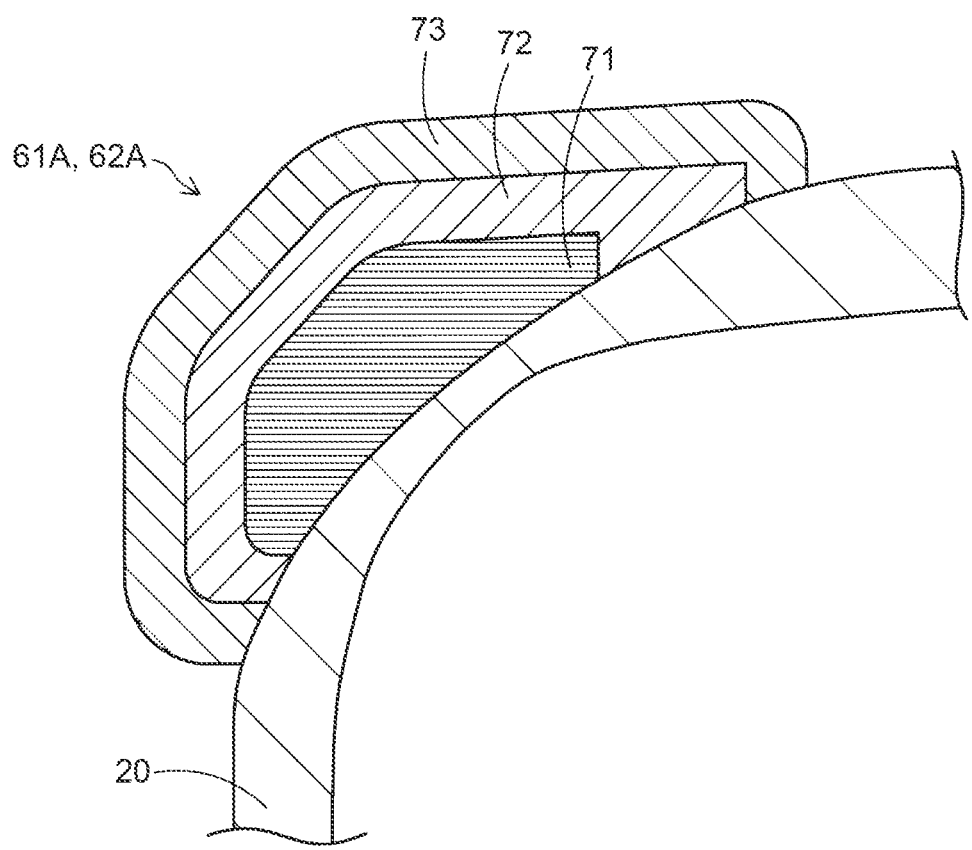
FIG. 9 is an enlarged sectional view showing another configuration example of the first and second protective members.

Furthermore, either one of the first layer 71 and the second layer 72 is not always necessary to be a single member, and may be divided into a plurality of members. For example, as shown in FIG. 9, a first protective member 61A and a second protective member 62A may be each configured such that, in order to divide the second layer 72 into two, a third layer 73 is further provided outward of the second layer 72. In this case, if respective static compression values of the first to third layers are defined as SP1 to SP3, either one of SP1<SP2 and SP2<SP3 may be satisfied, and the other two layers may be configured regardless of the degrees of the static compression values. The static compression values of the first to third layers may have the same static compression value, of course.

The first layer 71 may be divided not in the stacking direction but in a direction different from the stacking direction. The first protective member 61, the second protective member 62, and the like are each formed in a flat marker cone shape, but the shape is not limited to this shape; and for example, in the case of the second end plate part 92 side, the shape may be a bowl-like shape that covers the end-side mouth member 40. Alternatively, as seen from the direction of the center axis O the shape is not always required to be a circular shape (donut-like shape), but may be formed by arranging a plurality of small protective members. In this case, the plurality of protective members may be arranged on the circumference at an equal distance from the center axis O, or may be arranged regardless of the circumference at an equal distance from the center axis O. For example, the protective members may be randomly arranged, or may be arranged in accordance with a certain regularity such as a staggered arrangement.

The fluid stored in the high pressure tank may be a fluid other than hydrogen, such as a methane gas and a propane gas. The high pressure tank is not limited to an in-vehicle tank, but may be a tank installed in a house, research facility, or medical facility.

The present disclosure is not limited to the above-described embodiment, examples, and modifications, but may be embodied in various other forms without departing from the gist of the disclosure. For example, in order to partially or entirely solve the above-mentioned problem or partially or entirely attain the above-mentioned effects, technical features of the embodiments, examples, and modifications corresponding to technical features of the modes described in SUMMARY can be replaced or combined as appropriate. The technical features may be appropriately eliminated unless the present specification mentions that the technical feature is mandatory.

What is claimed is:

1. A high pressure tank comprising:
   a container body including dome parts and a barrel plate part;
   a reinforcement layer provided on an outer surface of the container body and including fiber-reinforced resin; and
   a protective member provided on an outer surface of the reinforcement layer,
   wherein the protective member includes a first layer disposed at the outer surface of the reinforcement layer that covers a part of the dome parts without extending to the barrel plate part, a second layer disposed at outward of the first layer, and a third layer is disposed at outward of the second layer and that substantially covers the second layer;
   wherein the first layer is more deformable due to the same load than the second layer is and the second layer is more deformable due to the same load than the third layer is; and
   wherein the static compression value of the first layer is 1/1.9 or less of the static compression value of the second layer.

2. The high pressure tank according to claim 1, wherein the first layer and the second layer are resin layers.

3. The high pressure tank according to claim 2, wherein the first layer and the second layer are resin layers including polyurethane.

4. The high pressure tank according to claim 1, wherein the second layer is provided so as to cover an entire outer surface of the first layer.

5. The high pressure tank according to claim 1, wherein the protective member is disposed at a position where the high pressure tank comes in contact with a horizontal plane when the high pressure tank erected in a perpendicular direction is inclined at an angle of 45 degrees from the perpendicular direction.

\* \* \* \* \*